July 30, 1940.	L. J. MEYER	2,209,606
NUT-CRACKING MACHINE
Filed Dec. 27, 1938	3 Sheets-Sheet 1

INVENTOR
LEO J. MEYER
BY
ATTORNEY

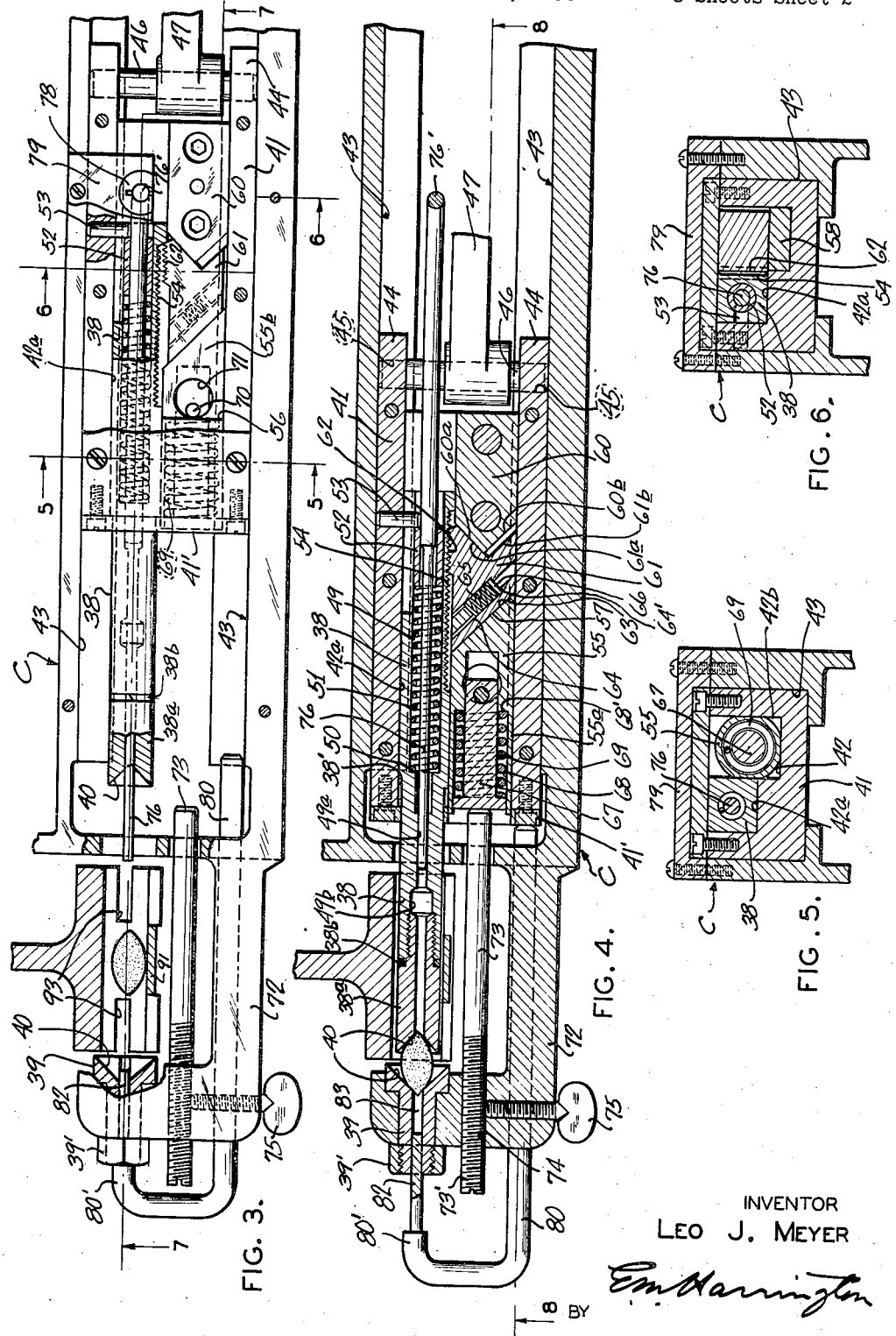

July 30, 1940.
L. J. MEYER
2,209,606
NUT-CRACKING MACHINE
Filed Dec. 27, 1938
3 Sheets-Sheet 3
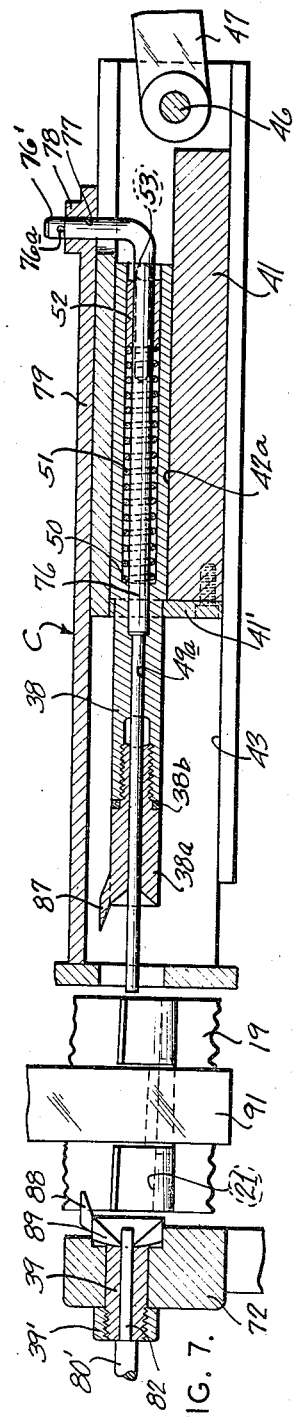
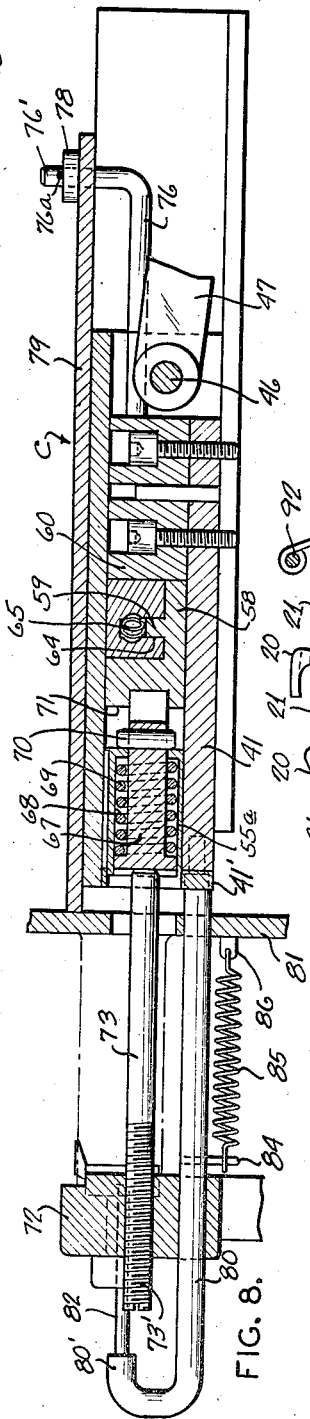
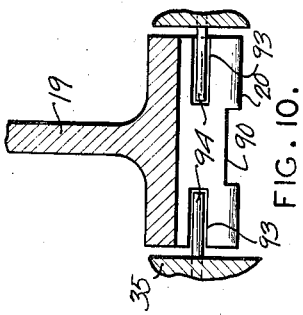
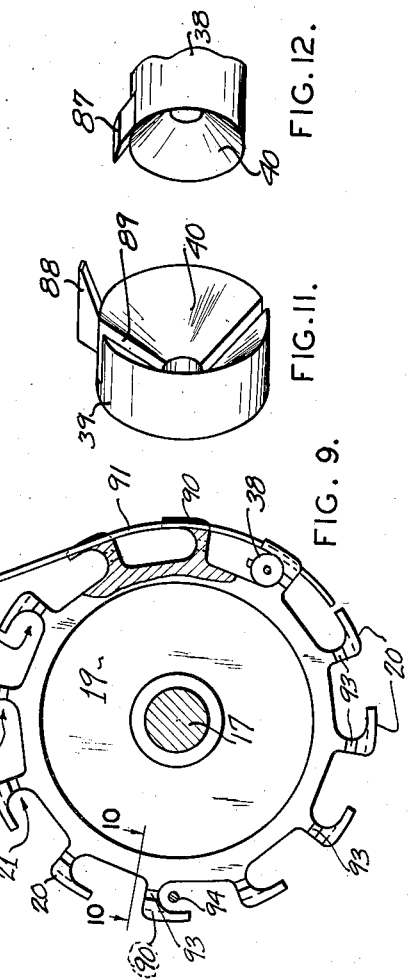
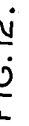
INVENTOR
LEO J. MEYER
BY *E. M. Harrington*
ATTORNEY Patented July 30, 1940

2,209,606

UNITED STATES PATENT OFFICE 2,209,606

NUT-CRACKING MACHINE

Leo J. Meyer, San Antonio, Tex., assignor to The Champion Pecan Machine Company, San Antonio, Tex., a corporation of Texas Application December 27, 1938, Serial No. 247,856

9 Claims. (Cl. 146—12)

This invention relates generally to nut-cracking machines of the type adapted to crack edible nuts and more specifically to such a machine which is provided with an improved compensating mechanism, or cracking box as it is frequently called, the predominant object of the invention being to provide a nut-cracking machine which includes as a part thereof a compensating mechanism, or cracking box, that is of such improved construction and arrangement that the efficiency of the nut-cracking machine is very greatly improved.

It is quite generally known that edible nuts, pecans, for instance, vary in size, particularly as to length. This situation makes it necessary that machines intended for use in cracking these nuts be provided with means for compensating for differences in the sizes of nuts to be cracked, for in the absence of such compensating mechanism, cracking movement of the nut cracking dies of the machines which would be proper for medium size nuts would be too great for longer nuts and would crush the meats thereof, while in the case of shorter nuts such die movement would not be sufficient to properly crack the nuts. It has been the practice, therefore, to provide nut-cracking machines of the type to which this invention relates, with compensating mechanisms and the main purpose of this invention is to provide a nut cracking machine which includes as a part thereof a compensating mechanism that is of greatly simplified construction and arrangement and which is capable of performing its intended function in a highly efficient manner.

Fig. 3 is an enlarged view, partly in plan and partly in horizontal section illustrating the cracking dies of the machine and parts associated therewith.

Fig. 4 is a horizontal section of the mechanism shown in Fig. 3.

Fig. 5 is a cross-section taken on line 5—5 of Fig. 3.

Fig. 6 is a cross-section taken on line 6—6 of Fig. 3.

Fig. 7 is a vertical section taken on line 7—7 of Fig. 3.

Fig. 8 is a vertical section taken on line 8—8 of Fig. 4.

Fig. 9 is a side elevation of the rotary nut-receiving member of the machine together with parts associated therewith.

Fig. 10 is an enlarged fragmentary section taken on line 10—10 of Fig. 9.

Fig. 11 is a perspective of the head of the fixed cracking die of the machine.

Fig. 12 is a perspective of the head of the movable cracking die of the machine.

Figures 1, 2:
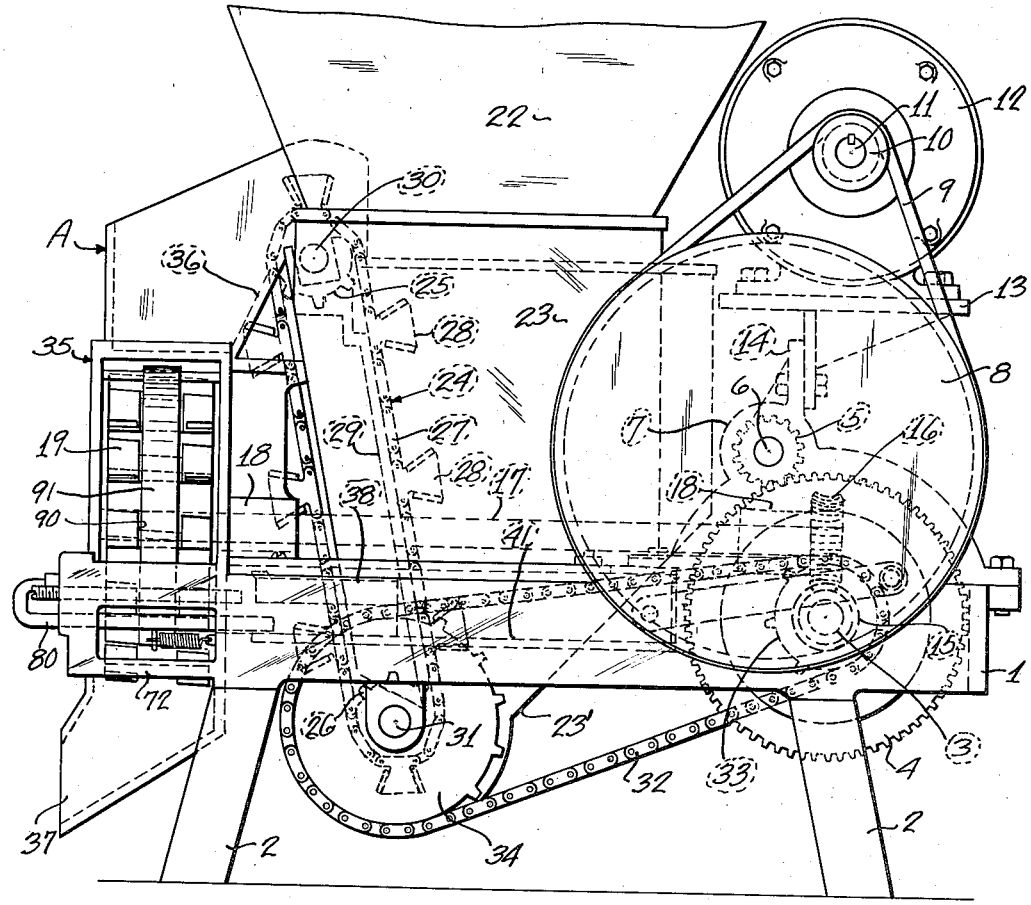
Fig. 1 is a side elevation of the improved nut cracking machine.
Fig. 2 is a fragmentary vertical section of the lower portion of the machine illustrated in Fig. 1.

In the drawings, wherein is shown for the purpose of illustration, merely, one embodiment of the invention, A designates the nut-cracking machine generally.

The nut-cracking machine A includes a frame or bed 1 which is supported on suitable legs 2 and this frame or bed supports the various parts of the machine which will be hereinafter described. Extended transversely of the bed of the machine A adjacent to an end thereof is a main shaft 3 which is mounted for rotary movement in suitable bearings (not shown) supported by the bed of the machine. The main shaft 3 has fixedly mounted thereon a gear wheel 4, the teeth of which are arranged to mesh with the teeth of a pinion 5 which is mounted on a shaft 6, said shaft 6 being mounted for rotation in a bearing 7 extended transversely of the machine above the bed thereof. Also mounted on the shaft 6 is a pulley 8, over which a power transmission belt 9 operates, this belt operating also over a smaller pulley 10 mounted on the power shaft 11 of an electric motor 12. The electric motor 12 is supported by suitable bracket means 13 which in turn is secured to a structure 14 of which the bearing 7 forms a part, the structure 14 being secured to and extended upwardly from the bed of the machine. It is obvious that rotary movement initiated by the motor 12 will be transmitted from the pulley 10 to the pulley 8 by the belt 9 so as to rotate the shaft 6 and thereby transmit rotary motion to the main shaft 3 of the machine through the pinion 5 and the gear wheel 4.

Fixedly mounted on the main shaft 3 of the machine A is a worm 15 with which a worm wheel 16 is arranged in mesh. The worm wheel 16 is mounted on a shaft 17 which extends longitudinally of the machine, said shaft being mounted for rotation in suitable bearings 18. At the end of the shaft 17 opposite to the end thereof at which the worm wheel 16 is mounted, a rotary nut-receiving member 19 is fixed to said shaft for rotary movement therewith. The rotary nut-receiving member 19 includes outwardly extended and circumferentially spaced portions 20 each of which is provided with a nut receiving pocket 21. It is important to note, however, that the nut-receiving pockets 21 are not parallel with respect to the axis of the shaft 17, but instead said pockets are extended longitudinally at a slight angle relative to the axis of the shaft 17 as shown to the best advantage in Figs. 1 and 2.

The nut-cracking machine A includes a hopper which receives nuts to be cracked by the machine, said hopper including a tapered upper portion 22 which communicates with a lower hopper 23 that is provided with an inclined lower wall 23' which leads to a curved bottom portion of the hopper. An endless conveyor 24 is arranged at an end wall of the hopper portion 23, said endless conveyor comprising upper and lower sprocket wheels 25 and 26 over which operates a sprocket chain 27 that is provided with spaced nut-receiving elements 28. It is to be noted that one flight of the endless sprocket chain 27 of the conveyor 24 moves upwardly within the hopper portion 23 in contact with the inner face of the end wall 29 thereof, and that the other flight of said sprocket chain moves downwardly in a position outside of said hopper portion. The upper sprocket wheel 25 of the endless conveyor is fixed to a shaft 30 which is mounted in suitable bearings (not shown) and the lower sprocket wheel 26 is mounted on a shaft 31 which likewise is supported by suitable bearing means (not shown). The sprocket chain 27 of the conveyer 24 receives its movement through the instrumentality of a sprocket chain 32 which operates over sprocket wheels 33 and 34 mounted on the shafts 3 and 31, respectively.

The rotary nut-receiving member 19 is disposed within a housing 35 which includes an upper inclined wall 36 and a lower discharge chute 37. In the operation of the machine illustrated in the drawings each nut-receiving element 28 of the endless conveyor 24 picks up a nut as said nut-receiving element passes upwardly through the hopper of the machine, wherein a store of nuts is maintained. As each nut-receiving element 28 passes over the upper sprocket wheel 25 the nut carried thereby is discharged therefrom onto the inclined wall 36, said nut sliding down said inclined wall into the main portion of the housing 35 of the rotary nut receiving member 19 where said nut is received by a pocket of said rotary nut-receiving member. The rotary nut-receiving member 19 is constantly rotated during operation of the machine and the nut so deposited in a pocket thereof is carried around by the nut receiving member, said nut being cracked during its travel with the nut-receiving member in a manner to be hereinafter explained, and being thereafter discharged in a cracked condition from the discharge chute 37.

The nut-cracking machine A includes as a part thereof an improved compensating mechanism which provides for the same cracking pressure being applied to various nuts, even though they are of different lengths. This compensating mechanism is shown in Figs. 3 to 8, inclusive, wherein the compensating mechanism is designated generally by the reference character C. The compensating mechanism C comprises a movable die 38, which is movable toward and from a fixed die 39, said fixed die being supported by a stationary part of the machine. The dies 38 and 39 are provided with nut-receiving cavities 40 formed in their nut-contacting faces.

The movable die 38 throughout its forward portion is circular in cross-section, while the rear portion of said movable die is of rectangular cross-section as shown to the best advantage in Figs. 5 and 6, there being a shoulder 38' at the point where the circular forward portion of the movable die meets the rectangular rear portion thereof. The movable die 38 is supported by a carriage 41, said carriage being provided with an opening 42 which includes a portion 42a shaped and dimensioned to receive the rectangular rear portion of the movable die for sliding movement therein. The carriage 41 in turn is supported for reciprocatory movement in a guideway 43 provided by a portion of the bed of the machine. The carriage 41 at its rear end is provided with transversely spaced apart portions 44 in which alined apertures 45 are formed (Figs. 3 and 4) and these apertures receive the opposite end portions of a pin 46, said pin serving to pivotally connect to said carriage the forward end portion of a link 47 whose rear end portion is pivotally connected to a disk 48 (Figs. 1 and 2) fixedly mounted on the shaft 3 whereby rotary movement of the shaft 3 and disk 48 will subject the carriage to reciprocatory movement.

The movable die 38 has formed longitudinally therein an opening 49 which is open at the rear end of the die as shown in Fig. 4, the portion of said opening formed in the rear portion of the movable die being of relatively large diameter, and said large diametered rear portion of the opening being provided with a shoulder 50 at its forward end where it meets an opening portion 49a of smaller diameter. Also this opening portion 49a terminates at its forward end in an enlarged opening portion 49b which is screw-threaded throughout its forward portion as shown in Fig. 4. This screwthreaded opening portion 49b receives the screwthreaded shank of the forward portion 38a of the movable die, this forward die portion being provided with the nut receiving cavity 40 previously mentioned herein as being a part of the movable die, and having an extension of the opening 49 formed therein. Also a split washer 38b is interposed between faces of the forward portion and the rearward portion of the movable die to prevent unintended rotation of the forward portion of the movable die with respect to the rearward portion thereof.

Disposed within the rear portion of the opening 49 formed in the movable die 38 is a coil spring 51 which contacts at its forward end with the shoulder 50. At its rear end the coil spring 51 contacts with a sleeve 52 which is loosely disposed within the rear portion of the opening 49, and the rear face of said sleeve contacts with a pin 53 which, as shown to the best advantage in Fig. 4, is supported by the carriage 41. Obviously, because the coil spring 51 tends to expand it normally maintains the movable die 38 in its forward position with respect to the carriage 41, however, as will be hereinafter described, the movable die is held stationary during a certain phase of the operation of the machine while the carriage 41 moves forwardly relative to the movable die, and during such movement of the carriage with respect to the movable die the coil spring 51 is compressed. The movable die 38 has formed in a side face thereof teeth 54 which serve a function to be hereinafter set forth.

As stated above the movable die 38 and the carriage 41 are normally arranged for relative movement. However at a certain time during the operation of the machine the movable die 38 is locked to the carriage so that said movable die will move with the carriage. In order to lock the movable die to the carriage as described the improved machine includes a locking mechanism which includes a member 55 which is disposed for sliding movement in a portion 42b of the opening 42 formed in the carriage 41 as shown to the best advantage in Figs. 3, 4, 5, 6 and 8. The forward portion 55a of the member 55 is of cylindrical form as shown in Fig. 5, this cylindrical portion extending from the forward end of the member 55 to the shoulder 56 (Fig. 3). The rearward portion 55b of the member 55 is of rectangular cross-section as shown in Fig. 6, said rectangular rearward portion extending from the shoulder 56 to the rear end of the member 55. The rearward portion 55b of the member 55 is provided with an inclined face 57 which is disposed at an angle of approximately 45° with respect to the opposed side faces of the member 55, and the member 55 includes a lower portion 58 which extends rearwardly of the inclined face 57 and this portion 58 is provided with a flange 59 which is disposed in parallelism relative to the inclined face 57. Arranged in rearwardly spaced relation with respect to the member 55 is a portion 60 which constitutes a fixed portion of the carriage 41 of the machine, said portion 60 being provided with inclined faces 60a and 60b which converge to a point as shown in Fig. 4.

Disposed between the member 55 and the portion 60 is a locking element 61 which is of generally rectangular shape when viewed in vertical section as shown in Fig. 6, said locking element being provided with teeth 62 adapted to interlock with the teeth 54 of the movable die 38. At its forward end the locking element 61 is provided with an inclined face 63 that contacts with the inclined face 57 of the member 55, and at its rear end the locking element 61 is provided with inclined faces 61a and 61b which correspond, generally, with the arrangement of the inclined faces 60a and 60b of the portion 60. The inclined face 61a of the locking element 61 contacts with the inclined face 60a of the portion 60 while the inclined face 61b of said locking element is spaced apart slightly from the inclined face 60b of said portion 60. The locking element 61 has formed therein a groove 64 which receives the flange 59 formed on the member 55, the groove 64, of course, being inclined in accordance with the inclination of said flange. The flange 59 of the member 55 is cut away at its approximate longitudinal center as shown in Figs. 4 and 7 to provide a receiving space for a coil spring 65, said cutaway portion of the flange being open at the upper edge of the flange and the coil spring 65 being interposed between an end wall of the cutaway portion and a disk 66 which is adapted to contact with the opposite end wall of said cutaway portion (Fig. 4). Also the groove 64 formed in the locking element 61 is of slightly reduced width at the lower portion of said locking element to provide shoulders 64' which are adapted to contact with the lower face of the disk 66. The coil spring 65 is adapted to expand and therefore said coil spring tends to move the locking element away from the movable die when the teeth of said locking element are in engagement with the teeth of said movable die.

Arranged within the cylindrical forward portion of the member 55 is an element 67 which comprises a shank portion having an enlarged head at its outer end. The opening 68 formed in the cylindrical forward portion of the member 55 comprises a forward portion of relative large diameter and a rear portion of smaller diameter with an annular shoulder 68' at the point where the larger and smaller opening portions meet, the larger opening portion being large enough to receive the enlarged head of the element 67, while the smaller, rear opening portion is only large enough to receive the shank portion of said element 67 (Fig. 4). A coil spring 69 is interposed between the inner face of the head of the element 67 and the shoulder 68' whereby said coil spring tends to move the element 67 outwardly with respect to the opening 68. Outward movement of the element 67 is limited by a pin 70 which is extended through the inner portion of the shank of said element and projects into enlarged openings 71 which are formed in portions of the member 55 at opposite sides of the smaller, rear portion of the opening 68 in the member 55, the opposite end portions of said pin normally contacting with the forward portion of the walls of said openings 70 as shown in Fig. 4.

The bed of the machine is provided with a forwardly extended and upwardly projected portion 72 which supports the fixed die 39 heretofore referred to, said fixed die comprising an enlarged head portion and a shank portion which are disposed in opening portions formed in the upwardly extended portion of the portion 72 and said fixed die being secured in place by a nut 39' (Fig. 4). The upwardly projected portion of the portion 72, also supports an elongated element 73, said elongated element being provided with a screwthreaded portion 73' which is disposed in a screw-threaded opening 74 formed in the upwardly projected portion of the portion 72, and said elongated element being adjustable longitudinally of its axis by rotating same. The elongated element 73 may be locked in positions to which it is so adjusted by a set screw 75. The elongated element 73 extends rearwardly of the machine to a position where its rear end may be contacted by the outer face of the head of the element 67 for a purpose to be hereinafter described.

The movable die 38 of the machine has associated therewith a nut ejector 76 (Fig. 7) which is disposed in the opening 49 formed through said movable die, said ejector being in the form of a rod having a rear portion of relative large diameter and a forward portion of smaller diameter so that said ejector portions may fit closely in the larger and smaller diametered portions of the opening 49. The rear portion 76' of the ejector 76 is turned at an approximate right angle with respect to the remainder of the ejector and this portion 76' of the ejector is extended through an elongated slot formed in the top wall of the carriage and is disposed in an aperture 77 formed in a boss 78 formed on a cover plate 79 of the portion of the bed of the machine which supports the carriage 41. The ejector 76 is secured in place by a pin 76a and said ejector is of such length that the forward end thereof is disposed within the opening 49 of the movable die 38 when said movable die is in its forwardly projected position as shown in Fig. 4. However when a nut cracking operation has been performed, in a manner to be hereinafter explained, and the movable die moves rearwardly relative to the stationary ejector 76, the forward portion of the movable die will be moved rearwardly of the forward portion of the ejector 76 as shown in Fig. 3 whereby a nut which may have become lodged in the cavity 40 of the movable die will be ejected therefrom by the nut ejector.

The fixed die 39 is likewise provided with nut ejecting means which comprises a rod 80 which is supported for sliding movement by the vertically projected portion of the portion 72 and by the wall 81 which constitutes a part of the bed of the machine (Fig. 8). The rod 80 is of approximately J-shape, and extended forwardly from the short leg 80' of said rod is an ejector pin 82 which extends into an opening 83 formed longitudinally through the fixed die 39 (Fig. 3). The rod 80 has extended therefrom a pin 84 to which is attached one end of a coil spring 85, the opposite end of said coil spring being attached to an extension 86 projected from the wall 81 of the bed of the machine. The coil spring tends to move the ejector rod 80 rearwardly of the machine so that the forward portion of the ejector pin 82 will be extended into the cavity 40 of the fixed die 39. However when the movable die moves toward the fixed die to perform a nut cracking operation the front plate 41' of the carriage 41 contacts with the rear end face of the ejector rod 80 as shown in Fig. 8 and moves said rod forwardly to move the ejector pin 82 out of the cavity 40 of the fixed die and forwardly of the opening 83 of said fixed die as shown in Fig. 4. The ejector pin 82 remains in this position during the nut cracking operation, and when the nut cracking operation has been completed and the carriage 41 moves rearwardly of the machine, the coil spring 85 will move the ejector rod 80 rearwardly of the machine to move the ejector pin through the opening 83 of the fixed die and project the end portion of said ejector pin into the cavity 40 of said fixed die. Such movement of the end portion of the ejector pin into the cavity 40 of the fixed die will eject a nut therefrom which has become lodged therein during the cracking operation.

In the operation of the machine, the nuts to be cracked are carried around in the pockets 21 of the rotary nut-receiving member 19 which is subjected to constant rotation during operation of the machine. As each pocket approaches the nut cracking position it passes between the adjacent ends of the movable die 38 and the fixed die 39, as shown to the best advantage in Fig. 2. As the nut to be cracked approaches the cracking position the carriage 41 and the movable die 38 are moving forwardly of the machine as a unit and eventually the forward end of the movable die contacts with the nut to be cracked and moves said nut into contact also with the fixed die 39 as shown in Fig. 4, the inclined arrangement of the pockets 21 permitting the movable die 38 to move into the pocket while the rotary nut-receiving member is rotating. At this point it is to be noted that the movable die 38 and the fixed die 39 are provided with projections 87 and 88, respectively, which serve to adjust the nut to its proper cracking position between said dies. Also the fixed die 39 is provided with a slot 89 which receives the projection 87 of the movable die when said movable die is moved into very close relation with respect to the fixed die.

When the nut to be cracked is positioned between the movable die 38 and the fixed die 39 as described further forward movement of the movable die is arrested, but the carriage 41, with the parts associated therewith continues its forward movement in response to rotation of the disk 48 on the shaft 3, to which the carriage is operably connected by the link 47. During such forward movement of the carriage 41 with respect to the movable die 38 the coil spring 51 is compressed, and when the carriage has moved the proper distance forwardly the element 67 contacts with the end of the elongated element 73. When this phase of the operation of the machine is reached forward movement of the carriage 41 continues but contact between the elongated element 73 and the element 67 arrests forward movement of said element 67, and its associated member 55, with the carriage. Now, as the forward movement of the carriage continues the inclined face 63 of the locking element 61 is forced against the inclined face 57 of the now stationary member 55 by the portion 60 which forms a part of the carriage, and through cooperation of the associated inclined faces 57 and 63 and the associated inclined faces 60a and 61a the locking element 61 will be cammed toward the movable die 38 to force the teeth of said locking element into engagement with the teeth of the movable die. The forward movement of the carriage continues after the movable die 38 has been locked to the carriage as described and at this time only a very slight forward movement of the carriage remains. During this final portion of the forward movement of the carriage the movable die 38 moves forwardly with the carriage and such forward movement of the movable die with the carriage cracks the shell of the nut between the movable die 38 and the fixed die 39. During the final nut cracking movement of the movable die and the carriage, the element 67 is held stationary because of contact between the elongated element 73 and said element 67, and the forward movement of the member 55 with the carriage compresses the coil spring 69. However because of its strength this spring is not compressed when the locking element 61 is cammed toward the movable die to lock said movable die to the carriage.

When the nut has been cracked, the carriage continuing its uninterrupted movement moves rearwardly, the forward plate 41' of the carriage engaging the shoulder 38' of the movable die 38 (Fig. 4) to cause said movable die to move rearwardly with the carriage. Such rearward movement of the movable die with the carriage causes the stationary ejector 76 associated with the movable die to be eventually projected into the cavity 40 of the movable die to dislodge the nut if it should become wedged in said cavity 40. Likewise rearward movement of the carriage will permit the coil spring 85 to move the ejector pin 82 forwardly into the cavity 40 of the fixed die 39 to dislodge the nut if it should become wedged in said cavity.

As the carriage moves rearwardly after the nut cracking operation, the locking element 61 remains in the position where its teeth are engaged with the teeth 54 until the shoulder 38' of the moving die contacts with the plate 41'. Then the element 67 moves away from the elongated element 73 and the coil spring 65 moves the locking element 61 away from the moving die to disengage the teeth 62 of the locking element from the teeth 54 of the moving die. This is an important feature of the invention inasmuch as the moving die remains locked to the carriage 41 of the machine until backed away from the cracked nut, thereby allowing no spring pressure on meat of the cracked nut which might crush said nut meat. Because no spring pressure is permitted against the cracked nut, the coil spring 51 may be heavier than would be otherwise possible, and said heavy coil spring 51 serves to seat the nuts firmly between the dies before the cracking pressure is applied to the nuts, so that there will be no slippage of the nuts, between the dies when the final cracking pressure is applied to the nuts.

The rotary nut-receiving member 19 rotates continuously during operation of the machine and after the nut has been cracked it is carried to a lower position by the rotary nut-receiving member where it may fall from the pocket thereof into the chute 37 by which it is discharged from the machine. With respect to the rotary nut-receiving member 19 it is to be noted that the peripheral faces of the portions 20 thereof are provided with circumferentially alined grooves 90 which, during rotation of the rotary nut-receiving member receive a curved bar 91 which is pivoted to a stationary part of the machine at 92 (Figs. 1, 2, and 9). This bar serves to straighten the nuts in the pockets 21 of the rotary nut-receiving member 19 as said nuts approach the nut cracking position. Also the portions 20 of the rotary nut-receiving member are provided with arcuately alined grooves 93 formed at the opposite sides thereof as shown in Figs. 9 and 10. These grooves move with respect to fixed pins 94 which extend inwardly from opposite walls of the housing of the nut-receiving member and serve to dislodge nuts which may become wedged in the pockets of the nut-receiving member (Fig. 10).

An important feature of the invention is that the opening formed longitudinally of the movable die 38 and the opening formed longitudinally of the fix die 39 receive the pointed opposite ends of the nut being cracked as shown in Fig. 4. This provides for properly positioning the nut between the cracking dies of the machine so that shell bursting pressure is applied by the dies at points where the shell of the nut will be properly cracked.

In view of the description of the operation of the machine as given above it is obvious that regardless of the lengths of the nuts being cracked each nut will be subjected to the same cracking pressure. In the case of a longer nut the movable die 38 will be arrested in its forward movement earlier, while the forward movement of the movable die, in the case of a shorter nut, will be arrested later. However each nut, as above stated, will be subjected to the same final cracking pressure.

I claim:

1. A nut-cracking machine comprising a frame, a carriage adapted for reciprocatory movement with respect to said frame, a fixed nut-cracking die, a movable nut cracking die supported by said carriage for sliding movement with respect thereto, and means for locking said movable die to said carriage for movement therewith, said means comprising a locking element supported by said carriage for straight-line movement into and out of locking engagement with said movable die, said locking element being provided with an inclined face, and a member having an inclined face which coacts with the inclined face of said locking element during movement of said carriage whereby said locking element is shifted into locking engagement with said movable die to lock the movable die and the carriage together, said member being disposed within a guideway formed within said carriage which limits said member to straight-line movement relative to said carriage and with respect to said locking element.

2. A nut-cracking machine comprising a frame, a carriage adapted for reciprocatory movement with respect to said frame, a fixed nut cracking die, a movable nut-cracking die supported by said carriage for sliding movement with respect thereto, and means for locking said movable die to said carriage for movement therewith, said means comprising a locking element supported by said carriage for straight-line movement into and out of locking engagement with said movable die, said locking element being provided with an inclined face, and a member movable with said carriage and having an inclined face which coacts with the inclined face of said locking element during movement of said carriage whereby said locking element is shifted into locking engagement with said movable die to lock the movable die and the carriage together, said member being disposed within a guideway formed within said carriage which limits said member to straight-line movement relative to said carriage and with respect to said locking element.

3. A nut-cracking machine comprising a frame, a carriage adapted for reciprocatory movement with respect to said frame, a fixed nut-cracking die, a movable nut cracking die supported by said carriage for sliding movement with respect thereto, and means for locking said movable die to said carriage for movement therewith, said means comprising a locking element supported by said carriage for straight-line movement into and out of locking engagement with said movable die, said locking element being provided with an inclined face, a member having an inclined face which coacts with the inclined face of said locking element during movement of said carriage whereby said locking element is shifted into locking engagement with said movable die to lock the movable die and the carriage together, and means located within a cavity formed in said locking element for moving said locking element out of locking engagement with said movable die.

4. A nut-cracking machine comprising a frame, a carriage adapted for reciprocatory movement with respect to said frame, a fixed nut-cracking die, a movable nut cracking die supported by said carriage for sliding movement with respect thereto, and means for locking said movable die to said carriage for movement therewith, said means comprising a locking element supported by said carriage for straight-line movement into and out of locking engagement with said movable die, said locking element being provided with an inclined face, a member having an inclined face which coacts with the inclined face of said locking element during movement of said carriage whereby said locking element is shifted into locking engagement with said movable die to lock the movable die and the carriage together, and spring means for moving said locking element out of locking engagement with said movable die, said spring means being located within a cavity formed in said locking element.

5. A nut-cracking machine comprising a frame, a carriage adapted for reciprocatory movement with respect to said frame, a fixed nut-cracking die, a movable nut cracking die supported by said carriage for sliding movement with respect thereto, and means for locking said movable die to said carriage for movement therewith, said means comprising a locking element supported by said carriage and movable into and out of locking engagement with said movable die, said locking element being provided with inclined faces at opposite ends thereof, a portion movable with said carriage and having an inclined face at one end of said locking element, a member supported by the carriage and having an inclined face which coacts with the inclined face at the opposite end of said locking element, said member being movable with said carriage and said carriage being movable with respect to said member, and an element adapted to arrest movement of said member during movement of said carriage whereby the inclined faces of said portion and said member coacting with the inclined faces of said locking element move said locking element into locking relation with said movable die.

6. A nut-cracking machine comprising a frame, a carriage adapted for reciprocatory movement with respect to said frame, a fixed nut-cracking die, a movable nut cracking die supported by said carriage for sliding movement with respect thereto, and means for locking said movable die to said carriage for movement therewith, said means comprising a locking element supported by said carriage and movable into and out of locking engagement with said movable die, said locking element being provided with inclined faces at opposite ends thereof, a portion movable with said carriage and having an inclined face which coacts with the inclined face at one end of said locking element, a member supported by the carriage having an inclined face which coacts with the inclined face at the opposite end of said locking element, said member being movable with said carriage and said carriage being movable with respect to said member, an independently movable stop element associated with said member, and an abutment adapted to arrest movement of said stop element and said member during movement of said carriage whereby the inclined faces of said portion and said member coacting with the inclined faces of said locking element move said locking element into locking relation with said movable die.

7. A nut-cracking machine comprising a frame, a carriage adapted for reciprocatory movement with respect to said frame, a fixed nut-cracking die, a movable nut cracking die supported by said carriage for sliding movement with respect thereto, and means for locking said movable die to said carriage for movement therewith, said means comprising a locking element supported by said carriage and movable into and out of locking engagement with said movable die, said locking element being provided with inclined faces at opposite ends thereof, a portion movable with said carriage and having an inclined face which coacts with the inclined face at one end of said locking element, a member supported by the carriage having an inclined face which coacts with the inclined face at the opposite end of said locking element, said member being movable with said carriage and said carriage being movable with respect to said member, an independently movable stop element associated with said member, a yieldable connection between said stop element and said member, and an abutment adapted to arrest movement of said stop element and said member during movement of said carriage whereby the inclined faces of said portion and said member coacting with the inclined faces of said locking element move said locking element into locking relation with said movable die, said yieldable connection serving to permit said member to move with the carriage relative to said stop element when said stop element is arrested by said abutment.

8. A nut-cracking machine comprising a frame, a carriage adapted for reciprocatory movement with respect to said frame, a fixed nut-cracking die, a movable nut cracking die supported by said carriage for sliding movement with respect thereto, and means for locking said movable die to said carriage for movement therewith, said means comprising a locking element supported by said carriage and movable into and out of locking engagement with said movable die, said locking element being provided with inclined faces at opposite ends thereof, a portion movable with said carriage and having an inclined face which coacts with the inclined face at one end of said locking element, a member supported by the carriage having an inclined face which coacts with the inclined face at the opposite end of said locking element, said member being movable with said carriage and said carriage being movable with respect to said member, an independently movable stop element associated with said member, a yieldable connection comprising a coil spring between said stop element and said member, and an abutment adapted to arrest movement of said stop element and said member during movement of said carriage whereby the inclined faces of said portion and said member coacting with the inclined faces of said locking element move said locking element into locking relation with said movable die, said yieldable connection serving to permit said member to move with the carriage relative to said stop element when said stop element is arrested by said abutment.

9. A nut-cracking machine comprising a frame, a carriage adapted for reciprocatory movement with respect to said frame, a fixed nut-cracking die, a movable nut cracking die supported by said carriage for sliding movement with respect thereto, and means for locking said movable die to said carriage for movement therewith, said means comprising a locking element supported by said carriage and movable into and out of locking engagement with said movable die, said locking element being provided with inclined faces at opposite ends thereof, a portion movable with said carriage and having an inclined face which coacts with the inclined face at one end of said locking element, a member supported by the carriage having an inclined face which coacts with the inclined face at the opposite end of said locking element and provided with a portion that supports said locking element for sliding movement, said member being movable with said carriage and said carriage being movable with respect to said member, an independently movable stop element associated with said member and an abutment adapted to arrest movement of said stop element and said member during movement of said carriage whereby the inclined faces of said portion and said member coacting with the inclined faces of said locking element move said locking element into locking relation with said movable die.

LEO J. MEYER.